Inventor:
Thomas Wilfert

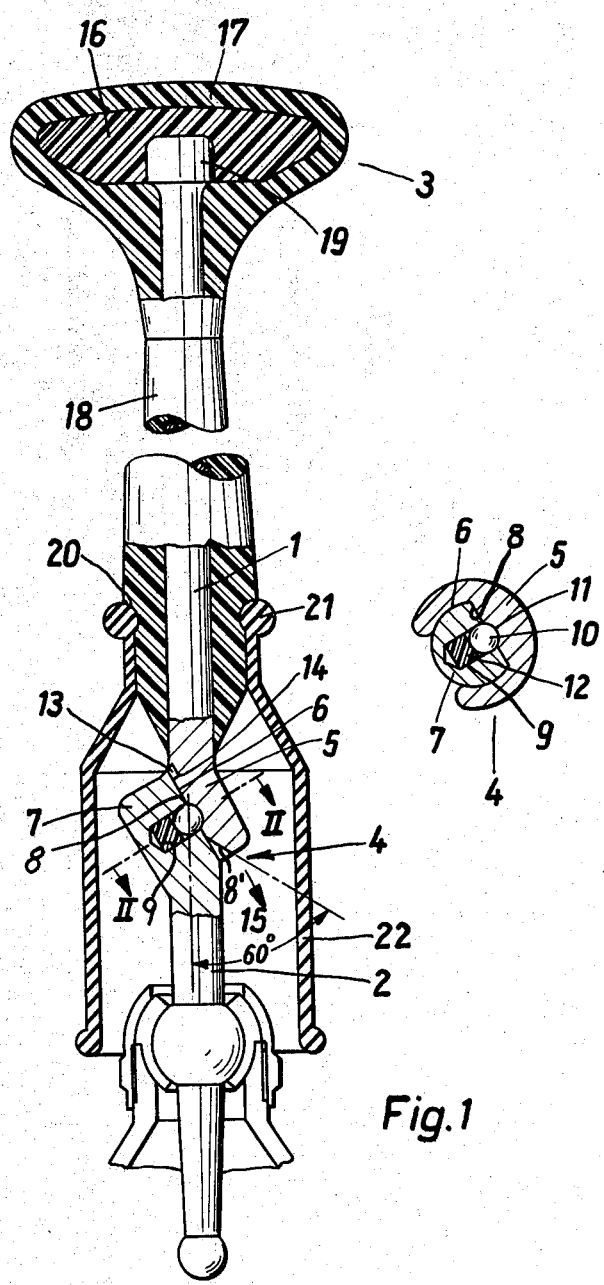

United States Patent Office
3,561,281
Patented Feb. 9, 1971

3,561,281
SAFETY CONTROL LEVER
Thomas Wilfert, 140 N. 15th St.,
Philadelphia, Pa. 19102
Filed Sept. 6, 1968, Ser. No. 757,846
Int. Cl. G05g 9/00, 25/00
U.S. Cl. 74—473
18 Claims

ABSTRACT OF THE DISCLOSURE

A safety control lever means adapted especially for a shift stick of motor vehicle transmissions. There are coupling means interconnecting adjacent end portions of first and second lever sections forming longitudinal extension relative to each other. The coupling means interconnection is operable automatically to yield for safety disengagement of the two lever sections in response to a shock-like load acting upon the first of the lever sections.

The present invention concerns a safety control lever, especially stick shift for motor vehicles.

Heretofore known control levers of this general type have the drawback that they form a rigid part in itself which, especially in case of an accident can cause considerable injuries.

It is, therefore, an object of the present invention to provide a control lever, especially stick shift for motor vehicles, which will overcome the above mentioned drawback.

It is another object of this invention to provide a control lever as set forth in the preceding paragraph, which, while during normal operation of the lever will assure a proper power transmission, will under a shock-like load be able to yield.

These and other objects and advantages of the invention will appear more clearly from the following specification in connection with the accompanying drawing, in which:

FIG. 1 illustrates partially in section a control lever according to the present invention.

FIG. 2 represents a section taken along the line II—II of FIG. 1.

Figures 3, 4:
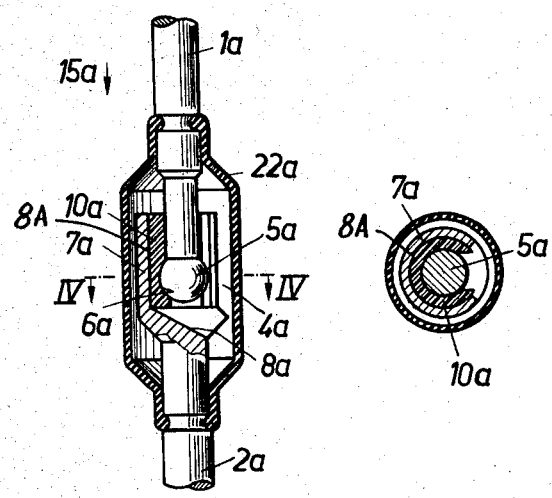
FIG. 3 is a section through a modified coupling.
FIG. 4 is a section along the line IV—IV of FIG. 3.

The safety control lever according to the present invention is characterized primarily in that it comprises at least two sections which are interconnected by a coupling operable positively to interconnect the said two sections. The arrangement is such that when the control lever is subjected to a sudden shock, the coupling is automatically disengaged so that the two sections of the control lever can yield and move relative to each other.

According to a further feature of the present invention, the coupling is provided with an undercut groove on one coupling portion and has a plug member fitting into said groove and forming a second coupling portion. This permits a very simple construction of the control lever according to the invention. In this connection it is particularly advantageous to design the groove at an incline, preferably at an acute angle of approximately 60°, with regard to the longitudinal axis of the lever because in such an instance the lever section carrying the handle will, when subjected to a shock-like load, also be able to move in a direction transverse to its longitudinal extension so that the lever section can tilt particularly quickly and yield to said load.

The coupling portions may be connected in a simple manner with each other without play when the side walls of the above mentioned groove are curved and the bottom surface of the groove is plane.

The safety lever according to the present invention may furthermore be simplified by employing a spring-loaded ball or the like as locking means for the coupling, said spring-loaded ball or the like preferably engaging a corresponding recess, preferably provided in the groove bottom of the other coupling portion.

According to a further development of the present invention, the coupling portions are in one direction of movement, preferably in the direction of movement of the lever section equipped with the handle, provided with abutments cooperating with the free end of the other lever section so that the two lever sections can be disengaged from each other in one direction only relative to each other. This will prevent that, for instance, control levers which, for carrying out a shifting movement, have to be pulled or depressed, will disengage during such shifting movement. According to one solution of the just mentioned problem, the coupling part with the groove is arranged on that lever section which is equipped with the handle while the upper end of the plug portion is equipped with an abutment extension adapted to engage a shoulder of the other coupling portion.

Another advantageous further development of the lever according to the present invention, which may be applied to other levers than the one referred to above, consists in that the preferably knob-shaped handle has a core of elastic material which is surrounded by an outer layer of a material of higher elasticity. In view of this outer layer with higher elasticity, the handle can be held particularly safely while on the other hand the soft core will afford great protection against injuries. The core and/or the outer layer may, in a simple manner, be made of foam material or polyurethane.

According to still another feature of the invention, the lever is anchored in the core by means of a widened extension so that the handle, in response to a shock-like load acting thereupon can be tilted elastically relative to the lever so as to be able to fold even when the shock-like load acts upon the lever eccentrically.

That lever section which is equipped with the handle is according to a further development of the invention provided with a protective layer of elastic material, preferably foam rubber, so that also this shank portion of the control lever cannot cause any bodily harm. The cross-section of the protective layer which expediently widens toward the coupling, is preferably conically designed.

According to a preferred embodiment of the invention, the said protective layer of the shank portion of the lever forms one piece with the outer layer of the handle so that the rigid parts of the control lever are completely covered.

In order to make injuries impossible by the coupling between the lever sections, and in order to protect the coupling against the entry of soil or the like, the coupling is surrounded by a cover, preferably a rubber sleeve or the like, held on that lever section which is equipped with the handle by means of a collar.

According to still another advantageous design of the present invention, the knob-shaped handle is considerably larger than the human eye socket so that it cannot enter the latter.

Referring now to the drawing in detail, FIGS. 1 and 2 illustrate a safety control lever according to the invention in the form of a collapsible stick shift which comprises two rectilinearly and serially arranged primarily cylindrical lever sections 1 and 2 of different length. The longer lever section 1 has that end thereof which is remote from the shorter lever section provided with a handle in the form of a knob 3.

The two lever sections 1, 2 are through the intervention of a coupling 4 connected to each other. That end of the lever section 1 which is remote from the knob 3 and forms a part of the coupling 4 is provided with a guiding member 5 forming one piece with the lever section 1 and comprising an undercut groove 6. This groove 6 is engaged by a plug member 7 provided at and forming part of that end of the lever section 2 which is adjacent the lever section 1, said plug member 7 forming one piece with the lever section 2. As will be seen from the drawing, the lateral surfaces of the groove 6 of the guiding member 5 are cylindrical and have the same curvature while the bottom 8 of the groove 6 is plane. Accordingly, the plug member 7 is substantially cylindrical and has a flat surface on one side for engagement with said groove bottom 8.

As will furthermore be seen from the drawing, the plug member 7 has a blind bore 9 which is substantially perpendicular to the plane of the groove bottom 8. Displaceably mounted in said bore 9 is a locking ball 10 for engagement with a correspondingly shaped recess 11 in the bottom 8 of groove 6. The closed end portion of the bore 9 contains a stopper 12 of elastic material, as for instance rubber, continuously urging said ball 10 outwardly.

As will be evident from FIG. 1, the longitudinal direction of the groove 6 has a bottom portion or part 8' thereof that extends at an angle of approximately 60° with regard to the longitudinal extension of the lever sections 1, 2. The upper end of the plug member 7 is provided with an abutment extension 13 engaging a corresponding shoulder 14 of the guiding member 5 in such a way that the lever section 1 which is equipped with the handle 3 can not be moved in the direction away from the other lever section 2 but only in the opposite direction relative to the lever section 2 from the position shown in FIG. 1.

If a shock-like load acts upon the lever section 1 and if this load is directed in the longitudinal direction of said lever section 1 toward the other lever section 2, the locking force of the locking ball 10 is overcome so that the guiding member 5 will be slidingly displaced on plug member 7 in the direction of the arrow 15 with the result that the lever section 1 completely disengages the lever section 2.

As shown in FIG. 2, also the guiding member 5 has a partially cylindrical outer surface while said plug member 7 is located within the projection of the guiding member 5 with regard to FIG. 2.

As shown in FIG. 1, the knob 3 has a core 16 of elastic material, for instance foamed polyurethane. The core 16 is surrounded by an outer layer 17 which likewise consists of elastic material, as for instance foamed polyurethane, the elasticity of which, however, is greater than that of the core 16 so that the elastic material is progressively effective fro mthe interior. The outer layer of the knob 3 merges with a conical protective layer 18 which surrounds the lever section 1 and extends up to the coupling member 5. That end of the lever section 1 which is equipped with the knob 3 has a widened collar 19 which is anchored in the elastic core 16.

Provided in the lower end of the protective layer 18 for the handle section 1 there is an annular groove 20 which is engaged by a marginal bead 21 of a substantially cylindrical sleeve 22 in such a way that the latter will be firmly held onto the lever section 1. The cylindrical portion of the sleeve 22 surrounds the coupling 4 interconnecting the lever sections 1 and 2 so that these lever sections are protected against soiling.

The locking force for the locking ball 10 is so selected that it will be overcome when the ball 10 is subjected to a shock-like load of approximately 8 kilograms acting in the longitudinal direction of the lever sections 1, 2. The cross-section of the lever section 1 which is preferably made of non-hardened steel or the like is at least at one area thereof so selected that the lever section 1, when subjected to a load of approximately from 18 to 25 kilograms in a direction perpendicular to its longitudinal direction, will be bent or will break.

The diameter of the preferably circular knob 3 is greater than the human eye socket so that injuries to the eye proper will be avoided.

According to another embodiment of the invention, the two lever sections are interconnected by a coupling the coupling elements of which are displaceable in the longitudinal direction of the lever sections, said coupling including a groove bottom portion 8a preferably being located along the longitudinal axis of said lever sections.

The embodiment according to FIGS. 3 and 4 has the following manner of operation. The shift lever consists of two lever parts or portions 1a, 2a of which the hand lever designated part or portion 1a forms the extension of the part or portion 2a which is journalled with respect to the motor vehicle. The two parts or portions 1a, 2a are connected or joined with respect to each other by way of a coupling 4a, which is formed by way of the two coupling parts 5a, 7a. The coupling part 7a provided with respect to the lower lever part 2a has a sectional formation according to FIG. 4 which means that the same is provided as a hull or sleeve open along one longitudinal side of which the internal recess has or possesses a bottom surface 8a which is inclined at an angle downwardly in the direction toward the open side of the sleeve 7a. In the sleeve 7a there is provided an elastomeric or resilient bushing intermediate member 10a which is also open on the same longitudinal side corresponding to that of the sleeve 7a whereby this slotted-type opening has a width which is smaller than the diameter of the coupling part 5a as well as that of the cylindrical shaft portion passing thereover or therefrom. The other coupling part is formed as a spherical head 5a for which in the elastomeric or resilient bushing or sleeve 10a there is a corresponding socket-formed or spherical-shaped recess forming means 6a provided therewith. In the assembled condition, the lever parts 1a, 2a are connected by way of a resilient or elastomeric hull or sleeve capable of uncovering the coupling 4a. If a shock-type force of relatively great strength is effective upon the lever part 1a horizontally in the direction of arrow 15a, or if a similar force is effective upon the lower lever part 2a horizontally and outwardly against the direction of arrow 15a with corresponding force, then the sphere 5a of a ball-joint socket type interconnection becomes pressed downwardly out of the elastomeric or resilient hull or sleeve 10a, whereby the sphere or head 5a reaches the inclined surface 8a and automatically is guided transverse to the axis of the lever means 1a, 2a to one side so that the two lever parts 1a, 2a separate from each other completely.

It is, of course, to be understood that the present invention is, by no means, limited to the particular showing in the drawing but that also modifications are possible, the invention being determined by the scope of the appended claims.

What I claim is:

1. A safety control lever, especially for shift stick of motor vehicle transmissions, which comprises: a first lever section, a second lever section forming the longitudinal extension of said first lever section, and coupling means interconnecting adjacent end portions of said first and second lever sections and operable automatically to yield for disengagement of said two lever sections in response to a shock-like load acting upon the first of said lever sections.

2. A control lever according to claim 1, in which said first lever section has that end thereof which is adjacent said second lever section provided with an undercut groove forming one portion of said coupling means, and in which that portion of said second lever section which is adjacent said undercut groove is provided with a plug portion fitting into said undercut groove and forming a second portion of said coupling means.

3. A control lever according to claim 2, and at least substantially in which said undercut groove has a bottom portion that extends approximately in the longitudinal direction of said first lever section.

4. A control lever according to claim 2, in which said undercut groove extends at an acute angle with regard to the longitudinal axis of said first lever section.

5. A control lever according to claim 4, in which said acute angle is approximately 60° for part of said groove.

6. A control lever according to claim 2, in which the side walls of said undercut groove are cylindrical having a common axis, and in which the groove bottom surface is substantially plane.

7. A control lever according to claim 2, which includes a spring loaded ball arranged in said plug portion, and in which the groove bottom surface is provided with a recess normally engaged by said ball.

8. A control lever according to claim 1, in which said coupling means comprise abutment means operable to cooperate with each other in at least one of several directions of movement of said lever.

9. A control lever according to claim 2, in which said first lever section has one end provided with a knob and has its other end provided with said undercut groove, said other end also being provided with a shoulder, and in which that part of said plug portion which is closest to said knob is provided with an abutment for engagement with said shoulder.

10. A control lever according to claim 1, in which that end portion of said first lever section which is remote from said second lever section is provided with handle means having a core of elastic material and an outer layer of a material of greater elasticity than the material of said core.

11. A control lever according to claim 10, in which at least one of the two portions forming said core and said outer layer is formed of foam material.

12. A control lever according to claim 10, in which at least one of the two portions forming said core and said outer layer is formed of polyurethane.

13. A control lever according to claim 10, in which said first lever section is at that end portion thereof which is remote from said second lever section provided with a widened extension anchored in said core.

14. A control lever according to claim 1, in which said first lever section is surrounded with a protective layer of elastic material.

15. A control lever according to claim 14, in which said protective layer increases in cross section toward said coupling means.

16. A control lever according to claim 14, in which said first lever section is provided with a handle, and in which said protective layer is integral with the outer layer of said handle and forms one piece therewith.

17. A control lever according to claim 1, which includes tubular means connected to said first lever section and extending over said coupling means to form a protective cover therefor.

18. A control lever according to claim 1, in which that end of said first lever section which is remote from said second lever section is provided with a knob of an enlarged substantially circular diameter for eye safety.

References Cited

UNITED STATES PATENTS

| | | | |
|---|---|---|---|
| 1,409,067 | 3/1922 | Russ | 287—103 |
| 1,482,944 | 2/1924 | Russ | 287—103 |
| 3,417,634 | 12/1968 | Dangauthier | 74—473 |
| 3,422,697 | 1/1969 | Brown et al. | 74—473P |

FRED C. MATTERN, JR., Primary Examiner

F. D. SHOEMAKER, Assistant Examiner

U.S. Cl. X.R.

74—523, 543; 287—103